US008386261B2

(12) United States Patent
Mellott et al.

(10) Patent No.: US 8,386,261 B2
(45) Date of Patent: Feb. 26, 2013

(54) TRAINING/COACHING SYSTEM FOR A VOICE-ENABLED WORK ENVIRONMENT

(75) Inventors: Mark B. Mellott, Pittsburgh, PA (US); Richard Anthony Bates, Allison Park, PA (US); Michael Laughery, Monroeville, PA (US); James R. Logan, Pittsburgh, PA (US)

(73) Assignee: Vocollect Healthcare Systems, Inc., Pittsburgh, PA (US)

( * ) Notice: Subject to any disclaimer, the term of this patent is extended or adjusted under 35 U.S.C. 154(b) by 537 days.

(21) Appl. No.: 12/616,964

(22) Filed: Nov. 12, 2009

(65) Prior Publication Data
US 2010/0125460 A1 May 20, 2010

Related U.S. Application Data

(60) Provisional application No. 61/114,920, filed on Nov. 14, 2008.

(51) Int. Cl.
*G10L 21/00* (2006.01)
(52) U.S. Cl. .................. 704/270.1; 704/270; 704/272
(58) Field of Classification Search .............. 704/275, 704/270, 231, 235, 257, 251, 270.1, 258, 704/260, 272; 379/88.02
See application file for complete search history.

(56) References Cited

U.S. PATENT DOCUMENTS

| | | |
|---|---|---|
| 1,483,315 A | 2/1924 | Saal |
| 1,753,317 A | 4/1930 | Rothen |
| 2,170,287 A | 8/1939 | Kinnebrew |
| D130,619 S | 12/1941 | Kendall et al. |
| 2,369,860 A | 2/1945 | Schroeder |
| D153,112 S | 3/1949 | Braun et al. |
| 2,506,524 A | 5/1950 | Stuck |
| 2,782,423 A | 2/1957 | Wiegand et al. |
| 2,958,769 A | 11/1960 | Bounds |
| 3,087,028 A | 4/1963 | Bonnin |
| D196,654 S | 10/1963 | Van Den Berg |
| D206,122 S | 11/1966 | Bradbury et al. |
| D206,665 S | 1/1967 | Sanzone |
| 3,327,807 A | 6/1967 | Mullin |
| 3,363,214 A | 1/1968 | Wright |
| D212,863 S | 12/1968 | Roberts |
| D215,545 S | 10/1969 | Husks |
| 3,654,406 A | 4/1972 | Reinthaler |
| 3,682,268 A | 8/1972 | Gorike |

(Continued)

FOREIGN PATENT DOCUMENTS

| | | |
|---|---|---|
| DE | 04138886 | 4/1993 |
| EP | 00732817 | 9/1996 |

(Continued)

OTHER PUBLICATIONS

Two-page Retail Technology article entitled Vocollect is the perfect pick at Nisa-Today's, published Dec. 31, 2004 in Business Media Ltd.; retrieved from Internet www.retailtechnology.co.uk/CaseStudies/vocollect.htm on Jan. 9, 2009.

(Continued)

*Primary Examiner* — Huyen X. Vo
(74) *Attorney, Agent, or Firm* — Wood, Herron & Evans, LLP

(57) ABSTRACT

A voice assistant system is disclosed which directs the voice Prompts delivered to a first user of a voice assistant to also be communicated wirelessly to the voice assistant of a second user so that the second user can hear the voice Prompts as delivered to the first user.

34 Claims, 4 Drawing Sheets

U.S. PATENT DOCUMENTS

| | | | |
|---|---|---|---|
| 3,781,039 A | 12/1973 | Edwards et al. | |
| 3,808,577 A | 4/1974 | Mathauser | |
| 3,873,757 A | 3/1975 | Berke et al. | |
| 3,969,796 A | 7/1976 | Hodsdon | |
| 3,971,900 A | 7/1976 | Foley | |
| 3,971,901 A | 7/1976 | Foley | |
| 3,984,885 A | 10/1976 | Yoshimura et al. | |
| 4,010,998 A | 3/1977 | Tolnar, Jr. et al. | |
| 4,018,599 A | 4/1977 | Hill et al. | |
| 4,024,368 A | 5/1977 | Shattuck | |
| 4,031,295 A | 6/1977 | Rigazio | |
| 4,039,765 A | 8/1977 | Tichy | |
| 4,049,913 A | 9/1977 | Sakoe | |
| 4,068,913 A | 1/1978 | Stanger | |
| 4,138,598 A | 2/1979 | Cech | |
| 4,189,788 A | 2/1980 | Schenke | |
| 4,213,253 A | 7/1980 | Gudelis | |
| RE30,662 E | 6/1981 | Foley | |
| 4,302,635 A | 11/1981 | Jacobsen | |
| D265,989 S | 8/1982 | Harris | |
| D268,675 S | 4/1983 | Hass | |
| 4,418,248 A | 11/1983 | Mathis | |
| 4,471,496 A | 9/1984 | Gardner | |
| 4,472,607 A | 9/1984 | Houng | |
| 4,495,646 A | 1/1985 | Gharachorloo | |
| 4,499,593 A | 2/1985 | Antle | |
| 4,619,491 A | 10/1986 | Drogo | |
| 4,620,760 A | 11/1986 | Duncan | |
| 4,634,816 A | 1/1987 | O'Malley et al. | |
| 4,649,332 A | 3/1987 | Bell | |
| 4,672,672 A | 6/1987 | Eggert et al. | |
| 4,689,822 A | 8/1987 | Houng | |
| 4,698,717 A | 10/1987 | Scheid | |
| 4,739,328 A | 4/1988 | Koelle | |
| D299,129 S | 12/1988 | Wiegel | |
| 4,811,243 A | 3/1989 | Racine | |
| 4,821,318 A | 4/1989 | Wu | |
| D301,145 S | 5/1989 | Besasie et al. | |
| 4,845,650 A | 7/1989 | Meade et al. | |
| 4,846,714 A | 7/1989 | Welsby | |
| 4,864,158 A | 9/1989 | Koelle et al. | |
| 4,874,316 A | 10/1989 | Kamon et al. | |
| 4,875,233 A | 10/1989 | Derhaag | |
| 4,888,591 A | 12/1989 | Landt et al. | |
| 4,907,266 A | 3/1990 | Chen | |
| 4,914,704 A | 4/1990 | Cole et al. | |
| 4,952,024 A | 8/1990 | Gale | |
| D313,092 S | 12/1990 | Nilsson | |
| 4,999,636 A | 3/1991 | Landt et al. | |
| 5,003,589 A | 3/1991 | Chen | |
| 5,010,495 A | 4/1991 | Willetts | |
| 5,012,511 A | 4/1991 | Hanle | |
| 5,018,599 A | 5/1991 | Dohi et al. | |
| 5,023,824 A | 6/1991 | Chadima et al. | |
| 5,024,604 A | 6/1991 | Savin | |
| D318,670 S | 7/1991 | Taniguchi | |
| 5,028,083 A | 7/1991 | Mischenko | |
| 5,030,807 A | 7/1991 | Landt et al. | |
| 5,055,659 A | 10/1991 | Hendrick et al. | |
| 5,056,161 A | 10/1991 | Breen | |
| D321,879 S | 11/1991 | Emmerling | |
| 5,063,600 A | 11/1991 | Norwood | |
| D326,655 S | 6/1992 | Iribe | |
| 5,148,155 A | 9/1992 | Martin et al. | |
| 5,155,659 A | 10/1992 | Kunert | |
| D330,704 S | 11/1992 | Wagner | |
| 5,177,784 A | 1/1993 | Hu | |
| 5,179,736 A | 1/1993 | Scanlon | |
| D334,043 S | 3/1993 | Taniguchi et al. | |
| 5,197,332 A | 3/1993 | Shennib | |
| 5,202,197 A | 4/1993 | Ansell et al. | |
| 5,208,449 A | 5/1993 | Eastman et al. | |
| 5,225,293 A | 7/1993 | Mitchell | |
| 5,241,488 A | 8/1993 | Chadima | |
| 5,251,105 A | 10/1993 | Kobayashi | |
| D341,567 S | 11/1993 | Acker | |
| 5,267,181 A | 11/1993 | George | |
| 5,280,159 A | 1/1994 | Schultz | |
| 5,281,957 A | 1/1994 | Schoolman | |
| D344,494 S | 2/1994 | Cardenas | |
| D344,522 S | 2/1994 | Taniguchi | |
| 5,305,244 A | 4/1994 | Newman et al. | |
| 5,309,359 A | 5/1994 | Katz | |
| 5,347,477 A | 9/1994 | Lee | |
| D351,841 S | 10/1994 | Blankenship et al. | |
| 5,357,596 A | 10/1994 | Takebayashi et al. | |
| 5,365,050 A | 11/1994 | Worthington et al. | |
| 5,365,434 A | 11/1994 | Figliuzzi | |
| 5,369,857 A | 12/1994 | Sacherman et al. | |
| 5,371,679 A | 12/1994 | Abe et al. | |
| 5,381,486 A | 1/1995 | Ludeke | |
| 5,386,494 A | 1/1995 | White | |
| 5,389,917 A | 2/1995 | LaManna | |
| 5,393,239 A | 2/1995 | Ursich | |
| 5,399,102 A | 3/1995 | Devine | |
| 5,406,037 A | 4/1995 | Nageno | |
| 5,410,141 A | 4/1995 | Koenck et al. | |
| 5,432,510 A | 7/1995 | Matthews | |
| 5,438,626 A | 8/1995 | Neuman | |
| 5,438,698 A | 8/1995 | Burton et al. | |
| 5,446,788 A | 8/1995 | Lucey et al. | |
| 5,456,611 A | 10/1995 | Henry | |
| 5,462,452 A | 10/1995 | Devine | |
| 5,469,505 A | 11/1995 | Gattey | |
| 5,478,252 A | 12/1995 | Lecomte | |
| 5,479,001 A | 12/1995 | Kumar | |
| 5,480,313 A | 1/1996 | d'Alayer de Costemore d'Arc | |
| 5,481,645 A | 1/1996 | Bertino | |
| D367,256 S | 2/1996 | Tokunaga | |
| 5,491,651 A | 2/1996 | Janik | |
| 5,501,571 A | 3/1996 | Van Durrett et al. | |
| 5,504,485 A | 4/1996 | Landt et al. | |
| 5,510,795 A | 4/1996 | Koelle | |
| 5,514,861 A | 5/1996 | Swartz et al. | |
| 5,515,303 A | 5/1996 | Cargin et al. | |
| 5,521,601 A | 5/1996 | Kandlur | |
| 5,535,437 A | 7/1996 | Karl et al. | |
| 5,550,547 A | 8/1996 | Chan et al. | |
| 5,553,312 A | 9/1996 | Gattey et al. | |
| 5,555,490 A | 9/1996 | Carroll | |
| 5,555,554 A | 9/1996 | Hofer | |
| 5,572,401 A | 11/1996 | Carroll | |
| 5,579,400 A | 11/1996 | Ballein | |
| D376,598 S | 12/1996 | Hayashi | |
| 5,581,492 A | 12/1996 | Janik | |
| 5,604,050 A | 2/1997 | Brunette et al. | |
| 5,607,792 A | 3/1997 | Garcia et al. | |
| 5,610,387 A | 3/1997 | Bard et al. | |
| D379,456 S | 5/1997 | Osiecki | |
| D380,199 S | 6/1997 | Beruscha | |
| 5,637,417 A | 6/1997 | Engmark | |
| 5,639,256 A | 6/1997 | Endo et al. | |
| D384,072 S | 9/1997 | Ng | |
| 5,665,485 A | 9/1997 | Kuwayama et al. | |
| 5,671,037 A | 9/1997 | Ogasawara et al. | |
| 5,673,037 A | 9/1997 | Cesar et al. | |
| D385,263 S | 10/1997 | Taylor | |
| D385,540 S | 10/1997 | Taylor | |
| D385,541 S | 10/1997 | Taylor | |
| 5,677,834 A | 10/1997 | Mooneyham | |
| 5,680,465 A | 10/1997 | Boyden | |
| D385,855 S | 11/1997 | Ronzani | |
| D387,898 S | 12/1997 | Ronzani | |
| 5,698,834 A | 12/1997 | Worthington et al. | |
| D390,552 S | 2/1998 | Ronzani | |
| D391,234 S | 2/1998 | Chacon et al. | |
| 5,716,730 A | 2/1998 | Deguchi | |
| 5,719,743 A | 2/1998 | Jenkins et al. | |
| 5,719,744 A | 2/1998 | Jenkins et al. | |
| D391,953 S | 3/1998 | Copeland | |
| 5,729,697 A | 3/1998 | Schkolnick | |
| D394,436 S | 5/1998 | Hall et al. | |
| 5,748,841 A | 5/1998 | Morin | |
| 5,757,339 A | 5/1998 | Williams et al. | |
| 5,762,512 A | 6/1998 | Trant et al. | |
| 5,763,867 A | 6/1998 | Main | |
| 5,766,794 A | 6/1998 | Brunette et al. | |

| | | | | | | |
|---|---|---|---|---|---|---|
| 5,774,096 A | 6/1998 | Usuki et al. | | D426,529 S | 6/2000 | Lohrding |
| 5,777,561 A | 7/1998 | Chieu et al. | | 6,071,640 A | 6/2000 | Robertson et al. |
| 5,781,644 A | 7/1998 | Chang | | 6,075,857 A | 6/2000 | Doss et al. |
| 5,787,361 A | 7/1998 | Chen | | 6,078,251 A | 6/2000 | Landt et al. |
| 5,793,878 A | 8/1998 | Chang | | 6,078,825 A | 6/2000 | Hahn et al. |
| D398,899 S | 9/1998 | Chaco | | 6,084,556 A | 7/2000 | Zwern |
| 5,803,750 A | 9/1998 | Purington et al. | | 6,085,428 A | 7/2000 | Casby et al. |
| 5,812,977 A | 9/1998 | Douglas | | 6,091,546 A | 7/2000 | Spitzer |
| 5,825,045 A | 10/1998 | Koenck et al. | | D430,158 S | 8/2000 | Bhatia |
| 5,828,693 A | 10/1998 | Mays et al. | | D430,159 S | 8/2000 | Bhatia et al. |
| D400,848 S | 11/1998 | Clark et al. | | 6,097,301 A | 8/2000 | Tuttle |
| 5,832,098 A | 11/1998 | Chen | | 6,101,260 A | 8/2000 | Jensen et al. |
| 5,832,430 A | 11/1998 | Lleida et al. | | 6,104,281 A | 8/2000 | Heinrich et al. |
| 5,839,104 A | 11/1998 | Miller et al. | | 6,109,526 A | 8/2000 | Ohanian |
| 5,841,630 A | 11/1998 | Seto et al. | | D430,882 S | 9/2000 | Tsai |
| 5,841,859 A | 11/1998 | Chen | | 6,114,625 A | 9/2000 | Hughes et al. |
| 5,844,824 A | 12/1998 | Newman et al. | | 6,120,932 A | 9/2000 | Slipy et al. |
| 5,850,181 A | 12/1998 | Heinrich et al. | | 6,122,329 A | 9/2000 | Zai |
| 5,850,187 A | 12/1998 | Carrender et al. | | D431,562 S | 10/2000 | Bhatia et al. |
| 5,856,038 A | 1/1999 | Mason | | 6,127,990 A | 10/2000 | Zwern |
| 5,857,148 A | 1/1999 | Weisshappel et al. | | 6,127,999 A | 10/2000 | Mizutani |
| 5,862,241 A | 1/1999 | Nelson | | 6,136,467 A | 10/2000 | Phelps et al. |
| D406,098 S | 2/1999 | Walter et al. | | 6,137,686 A | 10/2000 | Saye |
| 5,869,204 A | 2/1999 | Kottke et al. | | 6,137,868 A | 10/2000 | Leach |
| 5,873,070 A | 2/1999 | Bunte et al. | | 6,137,879 A | 10/2000 | Papadopoulos et al. |
| D406,575 S | 3/1999 | Michael et al. | | 6,149,451 A | 11/2000 | Weber |
| 5,884,265 A | 3/1999 | Squitteri | | 6,154,669 A | 11/2000 | Hunter et al. |
| 5,890,074 A | 3/1999 | Rydbeck | | D434,762 S | 12/2000 | Ikenaga |
| 5,890,123 A | 3/1999 | Brown et al. | | 6,157,533 A | 12/2000 | Sallam |
| D408,783 S | 4/1999 | Lucaci et al. | | 6,160,702 A | 12/2000 | Lee |
| 5,892,813 A | 4/1999 | Morin et al. | | 6,164,853 A | 12/2000 | Foote |
| 5,895,729 A | 4/1999 | Phelps et al. | | 6,167,413 A | 12/2000 | Daley |
| D409,137 S | 5/1999 | Sumita | | D436,104 S | 1/2001 | Bhatia |
| 5,903,870 A | 5/1999 | Kaufman | | D436,349 S | 1/2001 | Kim |
| 5,905,632 A | 5/1999 | Seto et al. | | 6,171,138 B1 | 1/2001 | Lefebvre et al. |
| D410,466 S | 6/1999 | Mouri | | 6,172,596 B1 | 1/2001 | Cesar et al. |
| D410,921 S | 6/1999 | Luchs et al. | | 6,173,266 B1 | 1/2001 | Marx et al. |
| D411,179 S | 6/1999 | Toyosato | | 6,179,192 B1 | 1/2001 | Weinger et al. |
| 5,909,667 A | 6/1999 | Leontiades | | 6,185,535 B1 | 2/2001 | Hedin |
| 5,912,632 A | 6/1999 | Dieska et al. | | 6,188,985 B1 | 2/2001 | Thrift |
| 5,920,261 A | 7/1999 | Hughes et al. | | 6,190,795 B1 | 2/2001 | Daley |
| 5,931,513 A | 8/1999 | Conti | | 6,195,053 B1 | 2/2001 | Kodukula |
| 5,933,330 A | 8/1999 | Beutler et al. | | 6,199,044 B1 | 3/2001 | Ackley et al. |
| 5,934,911 A | 8/1999 | Stout et al. | | 6,204,765 B1 | 3/2001 | Brady et al. |
| 5,935,729 A | 8/1999 | Mareno | | D440,966 S | 4/2001 | Ronzani |
| 5,941,726 A | 8/1999 | Koegel | | 6,225,777 B1 | 5/2001 | Garcia et al. |
| 5,941,729 A | 8/1999 | Sri-Jayantha | | 6,226,622 B1 | 5/2001 | Dabbiere |
| 5,942,987 A | 8/1999 | Heinrich et al. | | 6,229,694 B1 | 5/2001 | Kono |
| 5,945,235 A | 8/1999 | Clanton et al. | | 6,230,029 B1 | 5/2001 | Hahn et al. |
| D413,582 S | 9/1999 | Tompkins | | 6,233,559 B1 | 5/2001 | Balakrishnan |
| D414,470 S | 9/1999 | Chacon | | 6,233,560 B1 | 5/2001 | Tannenbaum |
| 5,950,167 A | 9/1999 | Yaker | | 6,235,420 B1 | 5/2001 | Ng |
| 5,956,675 A | 9/1999 | Setlur et al. | | 6,237,051 B1 | 5/2001 | Collins |
| 5,962,837 A | 10/1999 | Main | | D443,870 S | 6/2001 | Carpenter et al. |
| 5,966,082 A | 10/1999 | Cofino et al. | | 6,243,682 B1 | 6/2001 | Eghtesadi et al. |
| 5,974,384 A | 10/1999 | Yasuda | | 6,246,989 B1 | 6/2001 | Polcyn |
| D416,263 S | 11/1999 | Kuczyk et al. | | 6,261,715 B1 | 7/2001 | Nakamura et al. |
| 5,984,709 A | 11/1999 | Zink et al. | | 6,266,641 B1 | 7/2001 | Takaya |
| 5,991,085 A | 11/1999 | Rallison et al. | | D448,027 S | 9/2001 | Jones et al. |
| 5,991,726 A | 11/1999 | Immarco et al. | | 6,286,763 B1 | 9/2001 | Reynolds et al. |
| 5,993,246 A | 11/1999 | Moldenhauer | | D449,289 S | 10/2001 | Weikel et al. |
| 5,995,019 A | 11/1999 | Chieu et al. | | 6,302,454 B1 | 10/2001 | Tsurumaru |
| 5,999,085 A | 12/1999 | Szwarc | | 6,304,430 B1 | 10/2001 | Laine |
| 6,002,918 A | 12/1999 | Heiman et al. | | 6,304,436 B1 | 10/2001 | Branch et al. |
| 6,012,030 A | 1/2000 | French-St. George et al. | | 6,304,459 B1 | 10/2001 | Toyosato et al. |
| 6,016,347 A | 1/2000 | Magnasco | | 6,310,888 B1 | 10/2001 | Hamlin |
| D420,674 S | 2/2000 | Powell | | 6,318,636 B1 | 11/2001 | Reynolds et al. |
| 6,021,207 A | 2/2000 | Puthuff et al. | | 6,321,198 B1 | 11/2001 | Hank et al. |
| 6,022,237 A | 2/2000 | Esh | | 6,324,053 B1 | 11/2001 | Kamijo |
| 6,032,127 A | 2/2000 | Schkolnick | | D451,903 S | 12/2001 | Amae et al. |
| 6,036,093 A | 3/2000 | Schultz | | D451,907 S | 12/2001 | Amae et al. |
| 6,044,347 A | 3/2000 | Abella et al. | | D451,919 S | 12/2001 | Abboud |
| D422,962 S | 4/2000 | Shevlin et al. | | 6,325,507 B1 | 12/2001 | Jannard |
| 6,051,334 A | 4/2000 | Tsurumaru | | 6,326,543 B1 | 12/2001 | Lamp |
| D424,035 S | 5/2000 | Steiner | | 6,327,152 B1 | 12/2001 | Saye |
| D424,577 S | 5/2000 | Backs et al. | | 6,339,764 B1 | 1/2002 | Livesay et al. |
| 6,056,199 A | 5/2000 | Wiklof | | 6,349,001 B1 | 2/2002 | Spitzer |
| 6,060,193 A | 5/2000 | Remes | | D454,468 S | 3/2002 | Mano |
| 6,062,891 A | 5/2000 | Villiers | | D454,873 S | 3/2002 | Clark et al. |

| | | |
|---|---|---|
| 6,353,313 B1 | 3/2002 | Estep |
| 6,356,635 B1 | 3/2002 | Lyman et al. |
| 6,357,534 B1 | 3/2002 | Buetow et al. |
| 6,357,662 B1 | 3/2002 | Helton |
| 6,359,603 B1 | 3/2002 | Zwern |
| 6,359,777 B1 | 3/2002 | Newman |
| 6,359,995 B1 | 3/2002 | Ou |
| 6,364,675 B1 | 4/2002 | Brauer |
| 6,369,952 B1 | 4/2002 | Rallison et al. |
| 6,371,535 B2 | 4/2002 | Wei |
| 6,373,693 B1 | 4/2002 | Seto et al. |
| 6,373,942 B1 | 4/2002 | Braund |
| 6,374,126 B1 | 4/2002 | MacDonald, Jr. et al. |
| 6,376,942 B1 | 4/2002 | Burger |
| D457,133 S | 5/2002 | Yoneyama |
| 6,384,591 B1 | 5/2002 | Estep |
| 6,384,712 B1 | 5/2002 | Goldman |
| 6,384,982 B1 | 5/2002 | Spitzer |
| 6,386,107 B1 | 5/2002 | Rancourt |
| 6,394,278 B1 | 5/2002 | Reed |
| 6,404,325 B1 | 6/2002 | Heinrich |
| 6,422,476 B1 | 7/2002 | Ackley |
| 6,424,357 B1 | 7/2002 | Frulla |
| 6,429,775 B1 | 8/2002 | Martinez et al. |
| 6,434,251 B1 | 8/2002 | Jensen et al. |
| 6,434,526 B1 | 8/2002 | Cilurzo |
| 6,438,523 B1 | 8/2002 | Oberteuffer et al. |
| 6,445,175 B1 | 9/2002 | Estep |
| 6,454,608 B1 | 9/2002 | Kitahara |
| D463,784 S | 10/2002 | Taylor et al. |
| 6,486,769 B1 | 11/2002 | McLean |
| D466,497 S | 12/2002 | Wikel |
| D467,592 S | 12/2002 | Hussaini |
| 6,496,799 B1 | 12/2002 | Pickering |
| 6,500,581 B2 | 12/2002 | White et al. |
| 6,501,807 B1 | 12/2002 | Chieu |
| D468,730 S | 1/2003 | Wong et al. |
| D469,080 S | 1/2003 | Kohli |
| 6,504,914 B1 | 1/2003 | Brademann et al. |
| 6,509,546 B1 | 1/2003 | Egitto |
| 6,511,770 B2 | 1/2003 | Chang |
| 6,523,752 B2 | 2/2003 | Nishitani et al. |
| 6,525,648 B1 | 2/2003 | Kubler |
| 6,529,880 B1 | 3/2003 | McKeen |
| 6,532,148 B2 | 3/2003 | Jenks |
| 6,560,092 B2 | 5/2003 | Itou et al. |
| D475,996 S | 6/2003 | Skulley |
| D476,297 S | 6/2003 | Schwimmer |
| 6,574,672 B1 | 6/2003 | Mitchell et al. |
| 6,581,782 B2 | 6/2003 | Reed |
| 6,595,420 B1 | 7/2003 | Wilz, Sr. et al. |
| 6,597,465 B1 | 7/2003 | Jarchow |
| 6,607,134 B1 | 8/2003 | Bard et al. |
| 6,608,551 B1 | 8/2003 | Anderson |
| D480,074 S | 9/2003 | Tuhkanen |
| 6,628,509 B2 | 9/2003 | Kono |
| 6,639,509 B1 | 10/2003 | Martinez |
| D483,281 S | 12/2003 | Cobigo |
| D483,369 S | 12/2003 | Klemettila |
| D483,370 S | 12/2003 | Klemettila |
| 6,658,130 B2 | 12/2003 | Huang |
| 6,660,427 B1 | 12/2003 | Hukill |
| 6,663,410 B2 | 12/2003 | Revis |
| 6,677,852 B1 | 1/2004 | Landt |
| D487,064 S | 2/2004 | Stekelenburg |
| 6,697,465 B1 | 2/2004 | Goss |
| D487,276 S | 3/2004 | Cobigo |
| D487,470 S | 3/2004 | Cobigo |
| 6,710,701 B2 | 3/2004 | Leatherman |
| D488,146 S | 4/2004 | Minto |
| D488,461 S | 4/2004 | Okada |
| 6,731,771 B2 | 5/2004 | Cottrell |
| D491,917 S | 6/2004 | Asai |
| D491,953 S | 6/2004 | Arakaki et al. |
| D492,295 S | 6/2004 | Glatt |
| 6,743,535 B2 | 6/2004 | Yoneyama |
| 6,745,014 B1 | 6/2004 | Seibert |
| 6,749,960 B2 | 6/2004 | Takeshita |
| 6,754,361 B1 | 6/2004 | Hall |
| 6,754,632 B1 | 6/2004 | Kalinowski et al. |
| D494,571 S | 8/2004 | Polito |
| 6,769,762 B2 | 8/2004 | Saito et al. |
| 6,769,767 B2 | 8/2004 | Swab et al. |
| 6,772,454 B1 | 8/2004 | Barry |
| 6,778,676 B2 | 8/2004 | Groth et al. |
| 6,811,088 B2 | 11/2004 | Lanzaro et al. |
| 6,812,852 B1 | 11/2004 | Cesar |
| 6,816,063 B2 | 11/2004 | Kubler |
| 6,826,532 B1 | 11/2004 | Casby et al. |
| 6,830,181 B1 | 12/2004 | Bennett |
| 6,847,336 B1 | 1/2005 | Lemelson |
| 6,853,294 B1 | 2/2005 | Ramamurthy |
| 6,859,134 B1 | 2/2005 | Heiman et al. |
| 6,872,080 B2 | 3/2005 | Pastrick |
| 6,890,273 B1 | 5/2005 | Perez |
| D506,065 S | 6/2005 | Sugino et al. |
| 6,909,546 B2 | 6/2005 | Hirai |
| 6,910,911 B2 | 6/2005 | Mellott et al. |
| D507,523 S | 7/2005 | Resch et al. |
| 6,915,258 B2 | 7/2005 | Kontonassios |
| 6,934,675 B2 | 8/2005 | Glinski |
| 6,965,681 B2 | 11/2005 | Almqvist |
| D512,417 S | 12/2005 | Hirakawa et al. |
| D512,718 S | 12/2005 | Mori |
| D512,985 S | 12/2005 | Travers et al. |
| 6,971,716 B2 | 12/2005 | DePaulis et al. |
| 6,982,640 B2 | 1/2006 | Lindsay |
| 7,003,464 B2 | 2/2006 | Ferrans et al. |
| D517,556 S | 3/2006 | Cho |
| D518,451 S | 4/2006 | Nussberger |
| D519,497 S | 4/2006 | Komiyama |
| 7,028,265 B2 | 4/2006 | Kuromusha et al. |
| 7,052,799 B2 | 5/2006 | Zatezalo et al. |
| D522,897 S | 6/2006 | Kellond |
| 7,063,263 B2 | 6/2006 | Swartz et al. |
| D524,794 S | 7/2006 | Kim |
| D525,237 S | 7/2006 | Viduya et al. |
| 7,082,393 B2 | 7/2006 | Lahr |
| 7,085,543 B2 | 8/2006 | Nassimi |
| 7,099,464 B2 | 8/2006 | Lucey et al. |
| D528,031 S | 9/2006 | Kellond |
| 7,110,800 B2 | 9/2006 | Nagayasu et al. |
| 7,110,801 B2 | 9/2006 | Nassimi |
| D529,438 S | 10/2006 | Viduya et al. |
| D529,447 S | 10/2006 | Greenfield |
| 7,117,159 B1 * | 10/2006 | Packingham et al. ......... 704/275 |
| D531,586 S | 11/2006 | Poulet |
| 7,143,041 B2 | 11/2006 | Sacks et al. |
| D533,184 S | 12/2006 | Kim |
| 7,145,513 B1 | 12/2006 | Cohen |
| 7,146,323 B2 | 12/2006 | Guenther et al. |
| D535,974 S | 1/2007 | Alwicker et al. |
| D536,692 S | 2/2007 | Alwicker et al. |
| D537,978 S | 3/2007 | Chen |
| 7,194,069 B1 * | 3/2007 | Jones et al. ................ 379/88.02 |
| D539,816 S | 4/2007 | Aoki |
| 7,216,351 B1 | 5/2007 | Maes |
| D543,994 S | 6/2007 | Kurihara |
| 7,228,429 B2 | 6/2007 | Monroe |
| D548,220 S | 8/2007 | Takagi |
| D549,216 S | 8/2007 | Viduya |
| D549,217 S | 8/2007 | Viduya |
| D549,694 S | 8/2007 | Viduya et al. |
| 7,257,537 B2 | 8/2007 | Ross et al. |
| D551,615 S | 9/2007 | Wahl |
| D552,595 S | 10/2007 | Viduya et al. |
| D558,761 S | 1/2008 | Viduya et al. |
| D558,785 S | 1/2008 | Kofford |
| 7,319,740 B2 | 1/2008 | Engelke |
| 7,346,175 B2 | 3/2008 | Hui et al. |
| D565,569 S | 4/2008 | Viduya et al. |
| D567,218 S | 4/2008 | Viduya et al. |
| D567,219 S | 4/2008 | Viduya et al. |
| D567,799 S | 4/2008 | Viduya et al. |
| D567,806 S | 4/2008 | Viduya et al. |
| D568,881 S | 5/2008 | Hsiau |
| D569,358 S | 5/2008 | Devenish, III et al. |
| D569,876 S | 5/2008 | Griffin |

| | | |
|---|---|---|
| 7,369,991 B2 | 5/2008 | Manabe et al. |
| D571,372 S | 6/2008 | Brefka et al. |
| D572,655 S | 7/2008 | Osiecki |
| D573,577 S | 7/2008 | Huang |
| 7,398,209 B2 | 7/2008 | Kennewick et al. |
| 7,413,124 B2 | 8/2008 | Frank et al. |
| D583,827 S | 12/2008 | Wahl |
| D587,269 S | 2/2009 | Keeports |
| 7,487,440 B2 | 2/2009 | Gergic et al. |
| 7,496,387 B2 | 2/2009 | Byford et al. |
| 7,519,196 B2 | 4/2009 | Bech |
| D593,066 S | 5/2009 | Sheba et al. |
| 7,604,765 B2 | 10/2009 | Sugimoto et al. |
| D609,246 S | 2/2010 | Wahl |
| D612,856 S | 3/2010 | Wahl et al. |
| D626,949 S | 11/2010 | Wahl et al. |
| 8,011,327 B2 | 9/2011 | Mainini et al. |
| 8,086,463 B2 * | 12/2011 | Ativanichayaphong et al. .................. 704/275 |
| 8,128,422 B2 | 3/2012 | Mellott et al. |
| 2001/0017926 A1 | 8/2001 | Viamini |
| 2001/0046305 A1 | 11/2001 | Muranami |
| 2002/0003889 A1 | 1/2002 | Fischer |
| 2002/0015008 A1 | 2/2002 | Kishida |
| 2002/0021551 A1 | 2/2002 | Kashiwagi |
| 2002/0044058 A1 | 4/2002 | Heinrich |
| 2002/0076060 A1 | 6/2002 | Hall |
| 2002/0131616 A1 | 9/2002 | Bronnikov |
| 2002/0178344 A1 | 11/2002 | Bourguet |
| 2003/0095525 A1 | 5/2003 | Lavin |
| 2003/0130852 A1 | 7/2003 | Tanaka |
| 2003/0233165 A1 | 12/2003 | Hein |
| 2004/0024586 A1 | 2/2004 | Andersen |
| 2004/0063475 A1 | 4/2004 | Weng |
| 2004/0091129 A1 | 5/2004 | Jensen |
| 2004/0220686 A1 | 11/2004 | Cass |
| 2005/0010418 A1 | 1/2005 | McNair |
| 2005/0095899 A1 | 5/2005 | Mellott |
| 2005/0230388 A1 | 10/2005 | Wu |
| 2005/0272401 A1 | 12/2005 | Zatezalo |
| 2006/0044112 A1 | 3/2006 | Bridgelall |
| 2007/0080930 A1 | 4/2007 | Logan |
| 2007/0221138 A1 | 9/2007 | Mainini |
| 2008/0072847 A1 | 3/2008 | Liao |
| 2009/0134226 A1 | 5/2009 | Stobbe |

FOREIGN PATENT DOCUMENTS

| | | |
|---|---|---|
| EP | 1383029 | 1/2004 |
| EP | 1531418 | 5/2005 |
| GB | 02242099 | 9/1991 |
| WO | WO0041543 | 7/2000 |
| WO | WO02069320 | 9/2002 |
| WO | WO2005008476 | 1/2005 |
| WO | WO2007044755 | 1/2007 |

OTHER PUBLICATIONS

Seven-page International Search Report and Written Opinion mailed Jul. 6, 2010 for PCT/US2009/064344.

One-page Peripheral PDF's: http://cgi. ebay.com/USB-wireless-MOUSE-w-receiver-pocket-USB-HUB-PS-2-si_W0QQitemZ110007231278QQihZ001QQcategoryZ60264QQcmDZViewItem, Nov. 16, 2006.

Six-page www.vocollect.com—Vocollect PDF brochure, Nov. 2005.

Four-page Vocollect Speech Recognition Headsets brochure-Clarity and comfort. Reliable performance. Copyright Sep. 2005.

Four-page Vocollect Speech Recognition Headsets brochure—SR 30 Series Talkman High-Noise Headset. Copyright 2005.

Two-page Vocollect SR 20 Talkman Lightweight Headset Product Information Sheet. Copyright Aug. 2004.

Photographs 1-7 SR Talkman Headset Aug. 2004—Prior art.

Two-page Supplemental Vocollect SR 20, Talkman Lightweight Headset Product Information Sheet. Copyright Aug. 2004.

Fifteen-page Takebayashi, Spontaneous Speech Dialogu System TOSSBURG II—The User-Centered Multimodal Interface, Published Nov. 15, 2995.

Four-page Wang, "SALT: A Spoken Language Interface for Web-based Multimodal Dialog Systems," In Proc. ICSLP, 2002, pp. 2241-2244.

Three-page Bers, et al. "Designing Conversational Interfaces with Multimodal Interaction", DARPA Workshop on Broadcast News Understanding Systems, 1998, pp. 319-321.

US 6,335,860, 01/2002, Shin (withdrawn)

* cited by examiner

TRAINING/COACHING SYSTEM FOR A VOICE-ENABLED WORK ENVIRONMENT

RELATED APPLICATION

This Application is related to and claims the benefit of U.S. Provisional Patent Application Ser. No. 61/114,820, entitled "TRAINING/COACHING SYSTEM FOR A VOICE-ENABLED WORK ENVIRONMENT", filed on Nov. 14, 2008, which application is incorporated by reference herein.

This invention generally relates to the use of speech or voice technology in a voice-enabled work environment to facilitate a variety of tasks, and more specifically for a method of allowing one user of a voice assistant system to train or coach another user of the system.

BACKGROUND OF THE INVENTION

Speech or voice technology, in the form of speech recognition, is used in a variety of different environments to facilitate the completion of work or various tasks. Such voice-enabled work environments, for example, include voice-directed work environments and voice-assisted work environments.

In a typical voice-enabled work environment, the worker wears a mobile computer having voice or speech capabilities. The mobile computer is worn on the body of a user or otherwise carried, such as around the waist, and a headset device connects to the mobile computer, such as with a cable or possibly in a wireless fashion. In another embodiment, the mobile computer might be implemented directly in the headset. The headset includes one or more speakers for playing voice instructions or prompts and other audio that are generated or synthesized by the mobile computer to direct or assist the work of the user and to confirm the spoken words of the user. The headset also has a microphone for capturing the speech of the user, such as speech commands and other audio, to process the commands spoken by the user and to allow the entry of data and other system feedback using the user's speech and speech recognition.

One example of such a voice-enabled work environment is generally referred to as voice-directed work, as the user takes specific direction from the central system and their mobile computer like they might take direction from a manager or supervisor or from reading a work order or to-do list. One such voice-directed work system, for example, is provided in the Talkman® system that is available from Vocollect, Inc. also of Pittsburgh, Pa. The mobile and/or wearable computers allow the users that wear or use them to maintain mobility at a worksite, while providing the users with the necessary directions or instructions and the desirable computing and data-processing functions. Such mobile computers often provide a wireless communication link to a larger, more centralized computer system that directs the work activities of a user within the system and processes any user speech inputs, such as collected data, in order to facilitate the work. An overall integrated system may utilize a central system that runs a variety of programs, such as a program for directing a plurality of mobile computers and their users in their day-to-day tasks. The users perform manual tasks and enter data according to voice instructions and information they receive from the central system, via the mobile computers. Through the headset and speech recognition and text-to-speech capabilities of the mobile computer, workers are able to receive voice instructions or questions about their tasks, to receive information about their tasks, to ask and answer questions, to report the progress of their tasks, and to report various working conditions, for example.

Another example of a voice-enabled work environment is referred to as voice-assisted work. Such a work environment is involved in situations where flexibility is required and specific task direction is not necessary. In a voice-assisted work environment, users engage in a selective speech-dialog with the system when they need to. The voice-assisted work system is designed to accommodate various prompts, instructions, and information as selectively directed by the user and their voiced commands, rather than issuing continuous instructions in a set order as with a voice-directed work system. One such voice-assisted system is provided by the AccuNurse® system available from the assignee of this application, Vocollect Healthcare Systems, Inc. (VHS) of Pittsburgh, Pa.

One of the main challenges in a voice-enabled system centers around the training of new users. The voice user interface (VUI) that is part of the voice-enabled system requires a user to know what to say and when to say it. The problem that the trainer or coach or other supervisor faces is that it is very difficult to tell a user what to do with respect to the interface when the trainer or coach cannot hear what the user is hearing or where they are in an ongoing speech dialog. The same problem surfaces with regard to ongoing training/coaching of existing users as well as when new users join the organization and need to learn how to use the system or a new feature is implemented in an existing system.

To overcome this challenge, hardware solutions have been used. For example a trainer or coach might connect a separate piece of hardware, such as a small loudspeaker, to the mobile device or personalized headset that the user is using in order to be able to hear what the user is hearing. These hardware solutions, although they successfully accomplish the task, are cumbersome to use and require direct (and obtrusive) interaction with the user being helped, trained, or coached.

A need still therefore exists for a voice-enabled system in which a trainer or coach can more effectively coach another user. There is also a need for a coach or trainer to know the voice prompts as delivered to the user being coached or know where in the speech dialog the user is so that better training may be facilitated without the need for additional intrusive coaching-specific hardware on a user's computer or other inconveniences to the user.

SUMMARY OF THE INVENTION

A voice assistant system is disclosed which directs the voice prompts delivered to a first user of a voice assistant device to also be communicated wirelessly to the voice assistant device of a second user so that the second user can hear the voice prompts as delivered to the first user.

When a device in the system activates a coaching mode, one device (the coach device) makes a connection to another device (the coached device) to receive system prompts from the coached device, and thus hears what the person who is being coached would hear. The normal voice-enabled work functions of the coach device are suspended while the coach device instead plays, as speech, the system prompts received from the other device.

The coached device includes a coach support module configured to forward system prompts to the coach device when the coaching mode is activated without otherwise altering the functioning of the coached device. In one embodiment, a voice device of the invention may be used to either coach another user or to be coached by a user.

BRIEF DESCRIPTION OF THE DRAWINGS

The accompanying drawings, which are incorporated in and constitute a part of this specification, illustrate embodiments of the invention and, together with the Detailed Description given below, serve to explain the invention.

DETAILED DESCRIPTION OF EMBODIMENTS OF THE INVENTION

A training or coaching system is described wherein one user coaches another user in the proper use of a voice-enabled device 45 within a voice-enabled environment. Both the coaching user and the user being coached have voice-enabled devices 45 associated with a voice-enabled work system. One device may selectively be placed in a coaching mode such as by using a voice command or other input (such as a button or manual input) to the device. The coach device forms a connection with a selected coached device as part of the coaching mode. With a connection established, the coached device monitors the connection and forwards its system prompts to the connected and activated coach device. The present invention allows the coach or coaching user (coach device) to hear the same system prompts and tones that the coached user (coached device) hears, while each of the parties uses his or her own device with no additional hardware. No separate listening kits or disruptive processes are necessary at the coached device.

Figure 1:
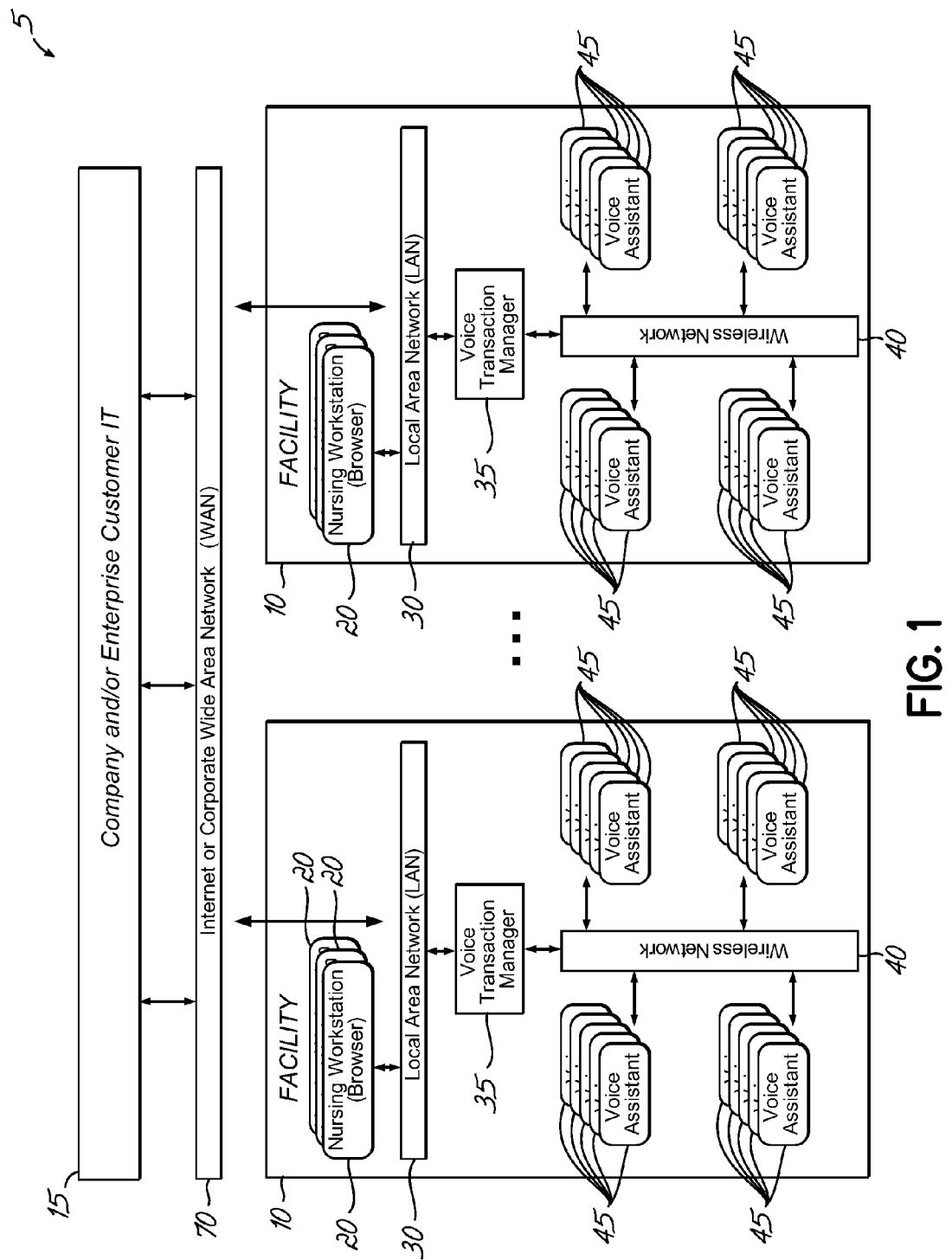
FIG. 1 is a block diagram of a distributed implementation of a voice assistant system consistent with the principles of the present invention.

Turning now to the drawing Figures, wherein like numbers denote like parts throughout the several Figures, as illustrated in FIG. 1, the present invention may be incorporated within a suitable voice-enabled work environment. Although a voice-assisted work environment is discussed herein for a patient-care application, it should be understood that the invention would have applicability in most any voice-enabled work environment, including voice-directed work environments.

FIG. 1 illustrates a voice-enabled system 5 in the form of a distributed computing system, with computing activities associated with at least one facility 10 and activities associated with an offsite company and/or an onsite enterprise customer IT department 15, such as an offsite Vocollect Healthcare Systems, Inc. Department. The system users are physically located at the facility 10, while centralized support and management capabilities for the voice-enabled system 5, on the other hand, may be provided by the offsite department and/or by the onsite enterprise customer IT department 15 which is coupled to the facility 10 with an appropriate network 70, such as a wide area network (WAN).

A workstation 20 at each facility 10 may interface with one or more portable computers in the form of voice-enabled devices 45. The voice-enabled devices 45 execute work plans and provide a user or worker a voice user interface (VUI) using speech and a speech dialog with the user.

The information associated with at least one work plan may be transmitted (e.g., in digital form) from the workstation 20 (e.g., using the network interface) via local area network (LAN) 30 to a voice transaction manager 35. Each facility 10 may have at least one voice transaction manager 35 to store and manage the work plans for the patients and patient care providers and facility configuration information. Specifically, the voice transaction manager 35 may represent and/or include practically any networked appliance, device, or computer as described hereinabove in connection with the workstation 25. The voice transaction manager 35 may be similar to a server computer in some embodiments. The voice transaction manager 35 may also include at least one database for storing the data. Data may also be transmitted from the voice transaction manager 35 to the workstation 20 through the network 30.

The information and data associated with at least one of the care plans in the voice transaction manager 35 may be transmitted (e.g., in digital form) from the voice transaction manager 35 (e.g., using the network interface) via wireless network 40 (e.g., a WLAN) to at least one voice-enabled device 45. Data may also be transmitted from the voice-enabled device 45 to the voice transaction manager 35, for example, for storage at the voice transaction manager 35 or at work station 20 and for additional processing.

The voice-enabled device 45 may include a number of separate portions or elements. In the embodiment illustrated in FIG. 2, a headset portion 50 (with a microphone, earpieces, and speakers) interfaces with a device portion 55 using and a connecting portion 60. In some embodiments, the connecting portion 60 may be a cable or may be a wireless link. The device 55 might be a portable or wearable computer device. In another embodiment, not shown, all necessary components of the voice-enabled device 45 may be contained in the headset portion 50 alone. That is, the functionality of the device 45 might be completely implemented in the headset portion 50.

The voice-enabled device 45 (or headset 50) also includes suitable processing and memory hardware and software to store and utilize the data received from the voice transaction manager 35. The voice-enabled device 45 is utilized to maintain a speech dialog with a user by utilizing certain speech commands and system Prompts.

The voice-enabled device 45 may be a wearable computer and/or a personal digital assistant (PDA) that includes WLAN capabilities in some embodiments. In particular, the voice-enabled device 45 may be a client, and more specifically a "thick client" that may allow speech recognition and speech synthesis to occur on the actual voice-enabled device 45, rather than remotely. One suitable embodiment of a voice-enabled device is set forth in U.S. patent application Ser. No. 12/536,696 filed Aug. 6, 2009, and entitled, "Voice Assistant System", which application is incorporated by reference herein in its entirety.

In accordance with the principles of the voice-enabled work, each user at the facility 10 may have their own voice-enabled device 45 that they wear or carry. The user may log on to the system 5 and data may be transferred from the voice transaction manager 35 to the voice-enabled device 45. The data may include the various elements of the user's work plan for that day for use in the voice-enabled work environment. The work plan and information and the data associated therewith may be accessed and utilized using speech in a speech dialog, as discussed further herein. For the disclosed example herein, the data may be associated with a care plan for one or more patients and will be used as a basis for the speech dialog carried on between a user and the system 5. However, it will be appreciated that the invention might be used with any number of different voice-enabled systems and environments The voice-enabled device 45 may support real time paging. For example, multiple devices 45 may communicate with each other via the wireless network 40 to send the pages directly. Alternatively, the pages may be first sent to the voice transaction manager 35, and then the pages may be relayed to the final destinations.

The speech dialog that is provided through the voice-enabled devices 45 may focus on various commands, and may include requiring the user to speak at least one input command with the device responding to the command and providing data or asking questions. The speech dialog may be based upon the data in the voice-enabled device 45 (FIG. 1), including the various patient care plans in one example. Such speech dialogs may be carried on with a voice-user interface (VUI) that includes speech recognition and text-to-speech (TTS) technology as would be understood by a person of ordinary skill in the art.

The speech dialog may be implemented through the VUI in a number of different ways and the application is not limited to a particular speech dialog or its progression. As noted above, in a voice-directed work environment, the speech dialog would include a constant stream of directions to a worker or user interspersed with spoken commands or spoken data entry by the user at appropriate junctures. This is implemented in generally a continual back-and-forth speech dialog for directing the user in the work environment. In a voice assisted environment, the speech dialog is less intrusive, and may be selectively engaged by a user. Generally, a user will speak a command, such as to request information or a work task, and the voice-enabled device will provide directions, data, or other synthesized speech output to the user in response. Herein, the spoken utterances or speech of a user, which will be utilized to engage in the speech dialog, will be referred to generally as voice commands or speech commands. In the VUI, the voice commands are subject to speech recognition technology to convert the voice command into a system command, such as text or data, in a form that may be utilized in the overall speech-enabled system. Alternatively, the system may provide its own data or text back to a user in what will be referred to herein as a system Prompt. Such system Prompts are in a data form to be processed through the system and are then converted into understandable speech by the text-to-speech features of the VUI to form what is referred to herein as a voice Prompt that may be played and heard by the user. That is, the speech dialog involves voice commands from the user to the device and voice Prompts from the device to the user. In the present invention, the Prompts that are directed or routed from a coached device to a coach device are generally referred to herein as system Prompts. The Prompts may be in any suitable data form to allow the data to be synthesized into speech and heard or listened to by a coach or trainer in accordance with the principles of the invention. Therefore, the terminology utilized herein to categorize the speech dialog is not limiting to the invention.

The speech dialog will depend on the specific voice commands of the user and the data that is needed by the voice-enabled device 45, or the information to be provided by the device 45. As may be appreciated, in the disclosed example, the speech dialog could take various different forms to provide, in the example, the information about a resident or a care plan to the user, or to obtain information and data about a resident pursuant to their care plan. The invention is not limited to the specific questions or format of any given speech dialog. The invention is directed to helping a user to learn how to interface through a speech dialog and also to assist another party in coaching or training a user in such an endeavor.

The voice-enabled device may also be utilized to provide the user with audible tones that assist in the interaction with the device 45. The audible tones provide an audible indication about various information or events without directly interrupting the user with a voice dialog. For example, an "all clear" tone may be provided when there are no active pages or reminders in the speech dialog, and an "incoming page" tone may be provided when the user has one or more active pages to listen to. The incoming page may be from another user and may include a recorded voice message similar to a conventional voicemail. However, the page is a silent page in that a public address system (i.e., PA system) need not be utilized, leading to less disruption. Those of ordinary skill in the art will appreciate that other tones may also be supported, and that many variations are consistent with the principles of the present invention in implementing a speech dialog.

As noted earlier, additional features and variations of an exemplary voice-assisted work system that might be utilized to implement the present invention are disclosed in U.S. Patent Application No. 61,114,920, assigned to the same assignee as the present application, which application is incorporated by reference herein as if fully set forth herein, and are also disclosed in the AccuNurse® System available from the assignee.

Figure 3:
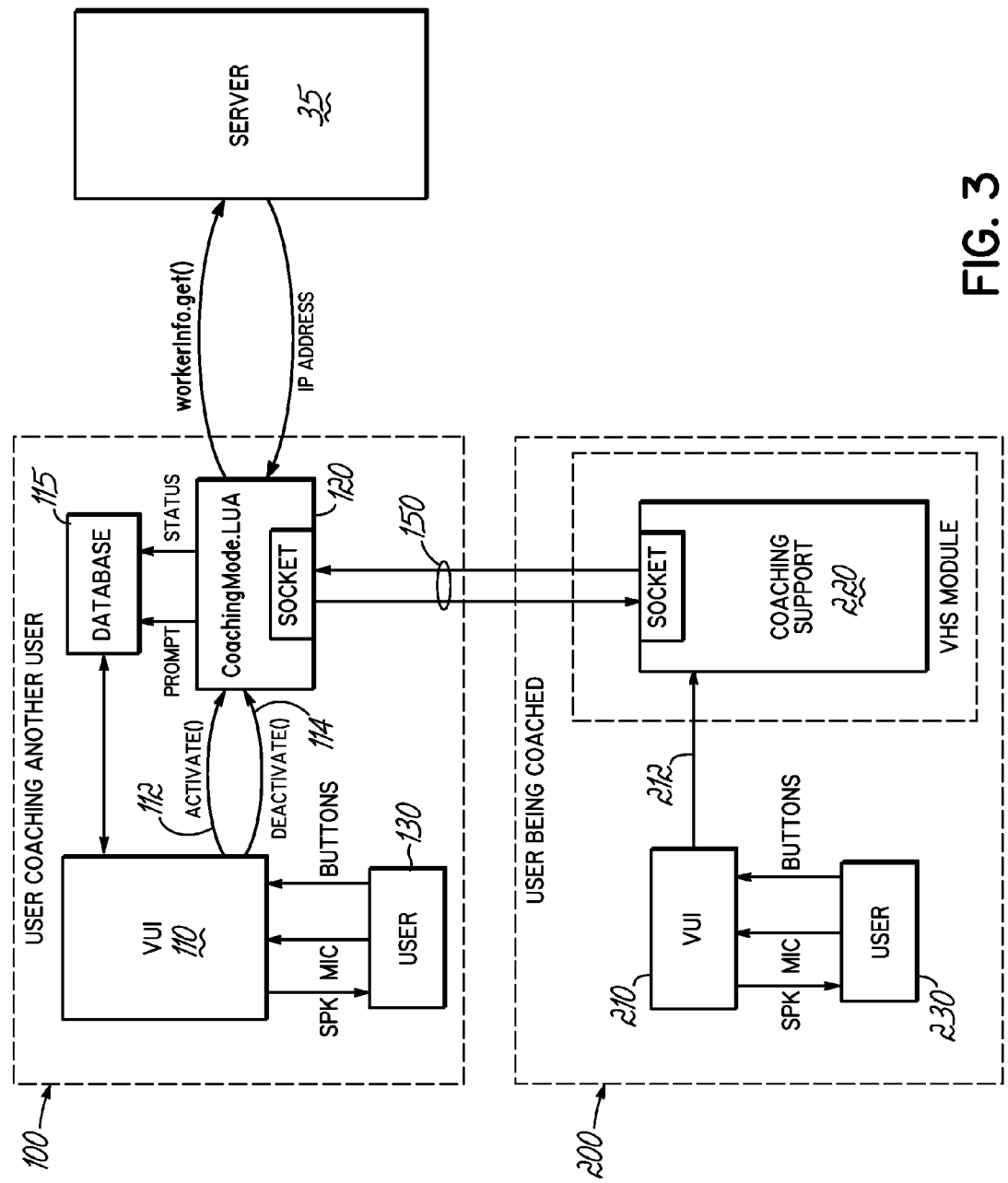
FIG. 3 is a diagrammatic view of two voice assistants interacting in a coaching relationship according to the present invention.

FIG. 3 illustrates one exemplary embodiment of the invention wherein one voice-enabled device 100 (the coach) and its user can enter a Coaching mode in order to listen to another voice-enabled device 200 (the coached) in accordance with coaching or training the user of that device 200. In this embodiment, the voice-enabled devices 100, 200 are configured generally similarly if not identically. Therefore, no additional or special set-up hardware or software is necessary for training. In fact, the Coaching mode could be configured in the opposite direction (the device 200 listening to the device 100) through a symmetrical process to the one described. Herein, for discussion purposes, the coaching user will be "User A" or "Coach", and the user that is being coached will be "User B", or "coached" user.

Figure 2:
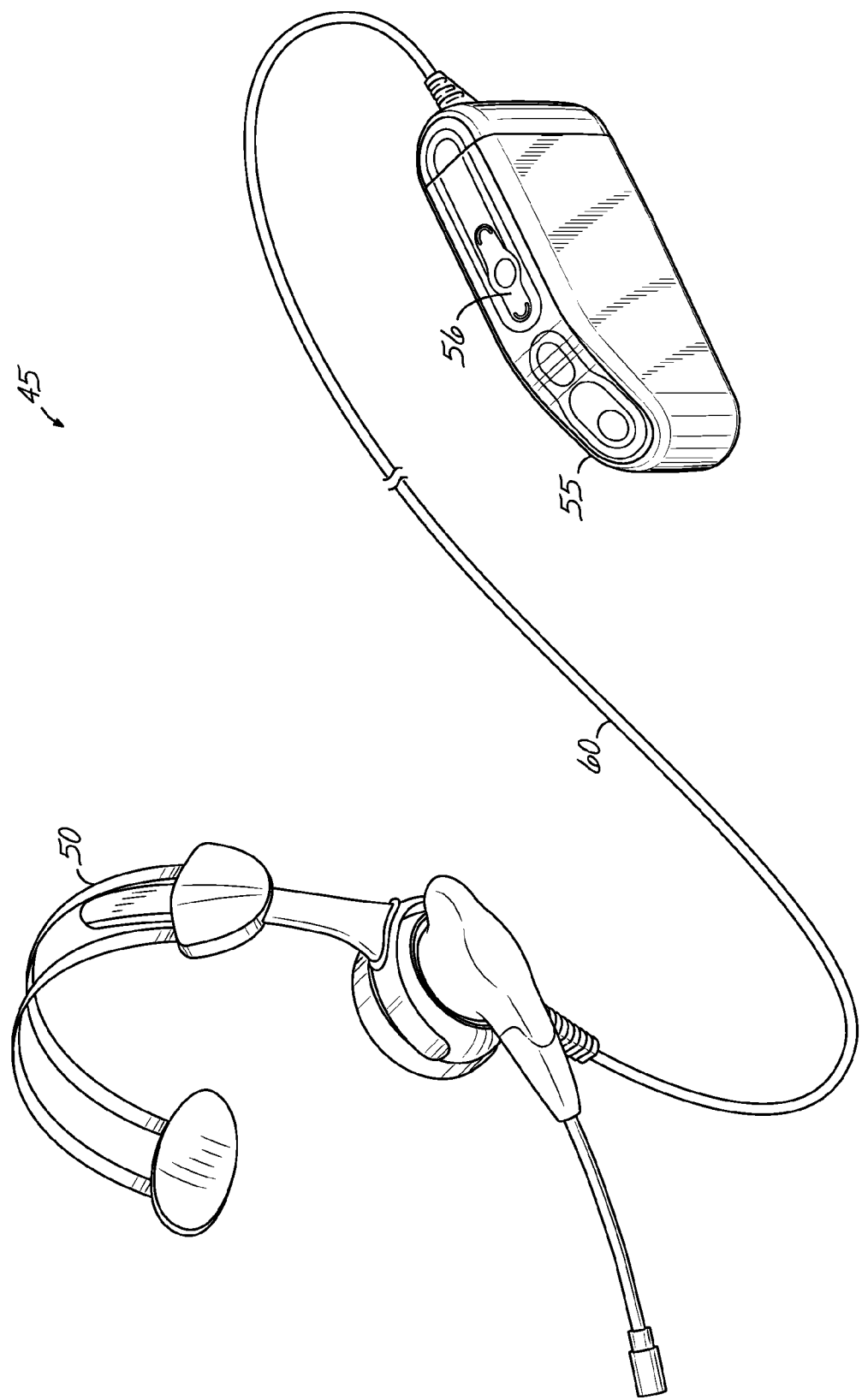
FIG. 2 is a side perspective view of one embodiment of a voice assistant of the voice assistant system of FIG. 1 consistent with the principles of the present invention.

The voice-enabled device 100 of the coach user (User A) that is coaching another user (User B) includes a voice user interface (VUI) 110 that implements the speech dialog with the coach user. The voice user interface 110 converts the coach user's spoken utterances or voice commands to system data or system commands through speech recognition technology, and converts system data or system Prompts to voice Prompts through text-to-speech technology. The voice Prompts are then played for the user through the headset. In one embodiment, the speakers and microphone associated with playing and receiving speech in the speech dialog are found in the user's headset, shown as portion 50 in FIG. 2. In addition to speech commands, in one embodiment, the VUI 110 also processes manual inputs, such as button commands associated with the one or more buttons 56 on the device portion 55 as shown in FIG. 2. The input/outputs streams whether speech (SPK, MIC) or manual (BUTTONS) are indicated as being provided by the user block 130 in FIG. 3. The VUI 110 also sends and receives data and Prompts from the database 115, which acts as a local storage medium for information relevant to the voice-enabled device 100 and the speech dialog for that device 100.

In order to initiate Coaching mode, several options might be used. In one embodiment, the coach user 130 associated with the voice-enabled device 100 issues a spoken voice command, such as "Coach [username]". For the illustrated example, the user may speak, "Coach User B". As part of processing this command, the VUI 110 examines a list of available user names on database 115, which may be the same set of names that is available for other user-to-user commands such as paging using the voice-enabled devices. In an alternative embodiment, the list of user names may be also be accessible by saying the command "coach" and then using one or more buttons 56 to scroll through the list of available users on database 115. In still another alternative, the coaching may be initiated by button presses only. For example, one or more of the buttons 56 may be used to access a menu wherein a selection of "coach" may be selected from the menu with the buttons 56. The buttons may then be used to scroll through a list of available users and select a user. Alternatively, once coaching mode is selected manually, the user might then use speech to select a user to coach. If the identified user name is in fact the user attempting to initiate coaching, the VUI 110 responds with the speech dialog response, "You are not permitted to coach yourself" and returns to a main menu, aborting the Coaching mode.

In some situations, the list of available users may not immediately update on device 100. A new or unexpected user may take time, for example up to five minutes, to appear on the list in database 115 and be available for coaching. The device 100 may need to retrieve an updated list from the voice transaction manager server 35.

Assuming a valid username is identified by the spoken "Coach" command, an Activate( ) method 112 is run on a Coaching mode module 120 of device 100. In one embodiment, the Coaching mode module 120 is implemented utilizing a suitable LUA script.

It should be understood that the implementation, as shown in FIG. 3, is illustrative or representative of the functionality of the various voice-enabled devices. Therefore, the figure is not an exact representation of the various hardware and software components of a device that may be used to implement the present invention. As such, the devices 100, 200 will utilize appropriate processing hardware and software for implementing the functionality of the devices in accordance with the principles of the invention. As such, the present invention is not limited to a particular hardware and software configuration, and various blocks and components in FIG. 3 do not necessarily set forth and are not limited to specific hardware or software components. A person of ordinary skill in the art will understand that the functionality of the present invention might be implemented in a number of different ways in a portable computer device with a suitable processor and appropriate hardware and software components.

The Coaching mode module 120 sends a look-up table request (workerinfo.get( )) to the voice transaction manager 35 to obtain the local network IP address associated with the valid username of the user to be coached, User B. If no local network address is returned, an error message is played to the user 130 and Coaching mode is aborted. If the server 35 returns a network IP address, the Coaching mode module 120 opens or establishes a direct socket connection 150 over the wireless network 40 to the voice-enabled device 200 of the user that is being coached (User B). If a direct socket connection cannot be established, an error message is played to user 130 and Coaching mode is aborted.

The voice-enabled device 100 gives status Prompts to the Coaching user User A as the connection is sought and established. In one embodiment, the user 130, as shown in FIG. 3, hears a spoken voice Prompt from the VUI 110 at five-second intervals until the socket connection is established or the process times out. If the connection is successfully established within 5 seconds, a message is played: "Coaching [user name]. Connected. Press the STOP button to exit coaching session." If establishing the connection takes longer than five seconds, then after five seconds the device 100 will produce the status Prompt, "Coaching [user name]. Connecting, please wait." After each additional five seconds, the status Prompt "Please wait" is heard. When the connection is thereafter established, another status Prompt is played: "Connected. Press the STOP button to exit coaching session." If a connection cannot be established after a set period of time, for example 15 seconds, an error message is played through VUI 110 and Coaching mode is aborted.

In one embodiment, a generic error message might be played that is the same regardless of the reason for the lack of connection: "Connection cannot be made at this time." The error message is always followed by return to the main menu of the VUI 110 with the appropriate main menu Prompt or tone as appropriate for the VUI.

The VUI 110 of voice-enabled device 100 continues to process voice commands and manual inputs from the associated user 130 during the establishment of the connection. In one embodiment, if the user 130 presses a STOP or CANCEL button of the voice-enabled device 100, or gives an abort voice command such as the spoken voice command, "Cancel", the VUI 110 runs a Deactivate( ) method 114 of the Coaching mode module 120 and aborts Coaching mode with a spoken message: "Exiting coaching session", followed by a return to the main VUI menu with the playing of an appropriate system Prompt or tone. The user 130 might then continue using their voice-enabled device 100 in an appropriate manner for the voice-enabled work.

Once the socket connection 150 is established and Coaching mode is running via Coaching mode module 120, the VUI 110 on the Coach device 100 continues to monitor the database 115 as well as monitoring the manual inputs or buttons. In one embodiment, voice recognition capabilities are generally deactivated in device 100 while Coaching mode is active, but the VUI 110 performs a program loop, waiting for a signal from a manual input, such as a CANCEL or STOP button of device 110 that will deactivate Coaching mode. This allows the coach user to then speak to and instruct the coached user on how to interface in the voice dialog and to discuss what responses to give and what words to say without the speech recognition features of the coach device trying to perform speech recognition on the coach user's speech. Therefore, the coach user is free to speak to the coached user, such as for instruction, without the coach device trying to perform speech recognition on the coach user's speech. While in Coaching mode, VUI 110 might also disable other features of device 100 so as not interrupt User A (user 130) while User A is coaching and listening to User B (user 230). For example, the coaching device 100 might be configured to not play the audible tones associated with pages or reminders sent to the coach User A as part of the voice-enabled system. Such tones that might confuse User A as to whether the page or reminder was intended for Coach User A or they are hearing a system Prompt in the form of an audible tone form (user 230). Instead, VUI 110 processes pages and reminders and plays the appropriate tones for User A (user 130) when Coaching mode is deactivated.

In an alternative embodiment, some limited speech recognition capabilities might continue to operate in coach mode to allow the coach user to exit Coaching mode with a spoken command such as "Cancel" rather than requiring a manual input. The speech recognition feature in that scenario would then only recognize a limited vocabulary for cancellation purposes.

As part of its operation, the voice-enabled device 200 includes an appropriate coaching support module 220 that receives a notification 212 whenever the VUI 210 handles a Prompt in order to then convey the Prompt to the user 230. This coaching support module 220 processes each notification of a system Prompt, as well as handling the establishment of a connection 150 through the wireless network with a coaching device 100, such as by providing a blocked thread waiting for new socket connections. The coaching support module 220 may serve a limited number of connections by including a limit on the number of open socket connections it will maintain, for example ten. If so, the coaching support module 220 may be configured to decline to activate any additional socket connections once the maximum is reached, which would cause the additional unit to fail to connect as detailed above.

Whenever the coaching support module 220 receives a system Prompt notification 212 through the VUI 210 of device 200, it checks to determine if there are any active socket connections that have been established, which indicate that there are coaching or listening users. If there are one or more coaching users, the module 220 sends information about the system Prompt to each connected coach device, such as device 100, as shown in FIG. 3. If there are not established connections, the system Prompt will be discarded by the module 220.

When the Coaching mode module 120 of the coach device 100 receives the notification of a system Prompt over the socket connection 150 from the coaching support module 220 of the coached device 200, the Coaching mode module 120 communicates the system Prompt to the local database 115. The coach VUI 110, which is looping in a software fashion to monitor the database 115, will process the new system Prompt, convert it to a voice Prompt or tone as appropriate, and play it to the coach user 130. In this way, the coach user 130 hears the system Prompts that are also played by the coached device 200 and heard by the coached user 230 (User B). The coach User A thus knows what the coached User B is hearing. This facilitates better training with minimal disruption to User B.

The Coaching mode module 120 continually monitors the socket connection 150 to make sure that it is open. Coaching mode can be discontinued in several ways. If the socket connection 150 is disengaged, such as by network failure or deactivation of the device 200, the Coaching mode module 120 communicates the disconnected status to the database 115. When the VUI 110 queries the database and processes this change in status, it will terminate the Coaching mode and return to the main menu. It may play a message to User A: "Connection lost. Exiting coaching session." It will then be out of coaching mode and may return to its normal operation.

If the coach device 100 is deactivated, such as by being disconnected or put to sleep, Coaching mode is also terminated such that when a user 130 next activates the device 100, it will be at the main VUI menu and not within Coaching mode.

During Coaching mode, in one possible embodiment, the VUI 110 of the coach device 100 is not receiving voice commands from the user 130, but continues to receive manual inputs, such as button inputs from the user 130. That is, the speech recognition feature of the VUI 110 might be disabled. The VUI 110 may continue to adjust the volume of the speakers in response to volume adjustment through use of the buttons 56. If the user 130 presses an appropriate STOP or CANCEL button, the VUI 110 runs the Deactivate( ) method 114 on the Coaching mode module 120 which deactivates the socket connection 150 and terminates Coaching mode with the message: "Exiting coaching session." The VUI 110 then returns to the main VUI menu of the voice-enabled device 100 and can then provide speech recognition and a speech dialog.

The data or Prompts transferred over the socket connection 150 between the coaching support module 220 and the Coaching mode module 120 is not audio or sound data, but is instead text or the equivalent. Once received, the system Prompts are converted to audible speech for the user 130 by the local VUI 110 of the coach device 100, thus reducing the load on the wireless network. Other sounds associated with the coached device 200, such as prerecorded pages or the commands said by the coached user 230, are not transferred to or played by the coach device 100 in one embodiment.

As explained above, the operation of the coached device 200 is, in one embodiment, almost entirely unaltered by being coached in accordance with one feature of the invention. That is, the coaching features provided by the invention do not disrupt the user that is being coached. Whenever the VUI 210 issues a system Prompt to the user 230, a notification of that system Prompt is also automatically sent to the coaching support module 220, which further sends the system Prompts to other units if applicable as noted above. However, the coached user 230 (User B) receives no notice as to whether the system Prompts that they are hearing are being sent, and has no direct or obvious way to tell if the coached device 200 is being coached or being listened to. The coaching process does not affect the coached user's ability to use the coached device 200 in its normal fashion for the various voice-enabled work tasks.

In one embodiment of the invention, a voice-enabled device will only enter Coaching mode if it is not currently being coached itself. If the coaching support module of the device includes any active socket connections (i.e., it is being coached and thus acting as a coached device), an error message will play to the user of that device and the device will return to the main menu instead, aborting Coaching mode, and playing the generic error message: "Connection cannot be made at this time." Because this error message is generic and not specific, the user of the voice-enabled device may still be unaware that he is being coached, and thus cannot become a coach himself and put his device into coaching mode. This invisibility of the coaching mode to the coached user that is provided by the present invention may be desirable in certain training situations.

In another embodiment, the user may be notified that the user's voice assistant is being coached by having the coached VUI 210 include some additional output such as a specific prompt or tone, background noises in the audio channel, or a visual indicator that the device is being coached. In training situations, visibility or awareness of the use of coaching may be desirable.

In one embodiment, a device that is currently in Coaching mode (original coach device) may subsequently be contacted by one or more additional coach devices with appropriate connections established. Thus, a coach user may be coached by other coach users in turn. In such a situation, Prompts received by the Coaching mode module of the original coach device and played for the original coach user would also be further relayed by the coaching support module of the original coach device and relayed to additional Coaching mode modules of the other additional coach devices. This "layered" use of the Coaching mode would successfully allow additional users to hear the prompts relayed to the original coach device, and may be useful in situations where there is a need to have multiple users involved in coaching or training another user, or there is a need to exceed the established limit (e.g. 10 sockets) to coaching connections as described above. Therefore, a coach may hear the Prompts and part of the dialog of a coached user either by connecting directly to a coached user or by connecting (via a coaching session) to another coach who is connected to the coached user.

Figure 4:
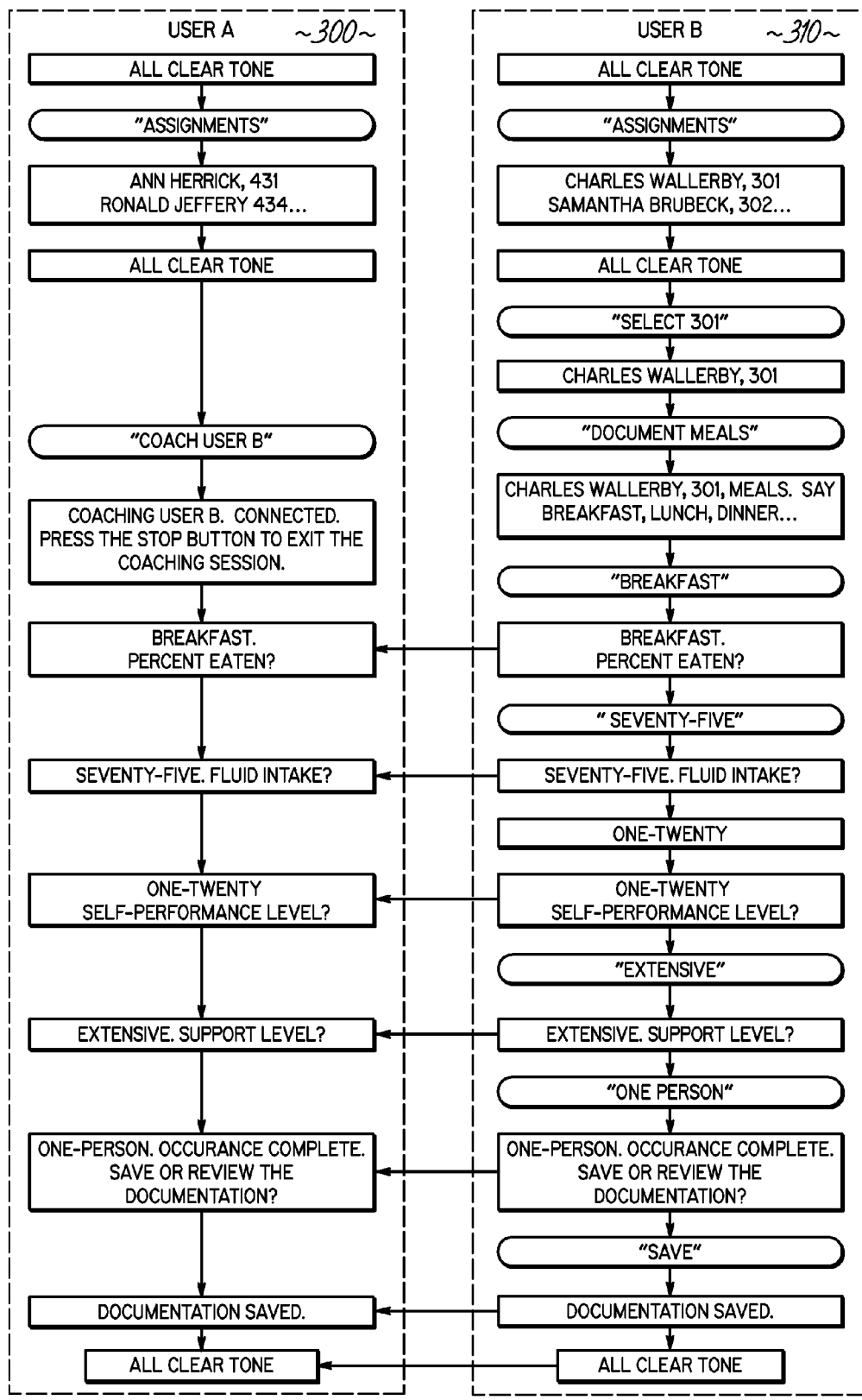
FIG. 4 is an exemplary coaching routine executed by the voice assistant system of FIG. 1 consistent with the principles of the present invention.

FIG. 4 illustrates one example of a use of the Coaching mode. In this example, User A is the coach user, and their device is configured to coach or listen to the device of User B, the coached user. Block 300 refers to the system Prompts heard by User A, while block 310 refers to the Prompts and ongoing speech dialog of User B as User B works and performs various tasks.

Although the terms "coaching" and "coached" are used above with respect to one user listening to the Prompts given to another user, it is to be understood that the device may be used during a coaching process in reverse, with the person to be coached listening to the Prompts of the coach as part of the training process. This feature may also have applications outside of the coaching process, and no such usage restriction is intended.

This invention provides a variety of benefits over the training kits of the prior art. A coach or trainer can initiate a coaching session without having to disrupt the user being coached, because nothing needs to be connected to the coached user's device. The coach or trainer does not have to locate, assemble, and wear any sort of listening kit, and can initiate a coaching session in a matter of seconds making use of the equipment already being used as part of the voice-enabled work environment. The coach is able to teach and reinforce best practices of using the mobile device and personalized headset because the coach is using the same equipment that the user is using to navigate through the VUI for the voice-enabled system. Because the connection occurs over a wireless network, the coach does not even need to be in the same location as the user they are coaching, but can connect and listen remotely, which is not possible with loudspeaker-based training kits.

Although the embodiment listed above uses two identical voice-enabled devices functioning on the same local area network, the coaching function could also be performed at a distant site and with different equipment, and may be a direct communication between the devices as disclosed above or may be through a server or other intermediary.

The above embodiments are intended to be illustrative and not limiting on the scope of the invention.

What is claimed is:

1. A device for a voice-enabled work environment comprising:
   a network interface operable to communicate with a wireless network;
   a voice user interface operable to,
      upon receiving a system Prompt, convert the system Prompt into speech in the form of a voice Prompt for a user, the voice user interface further operable to generate a notification regarding the system Prompt; and
      upon receiving a voice command from the user, use speech recognition technology to convert the voice command into a system command; and
   a coaching support module coupled with the voice user interface and configured to monitor the system Prompt notifications generated by the voice user interface, the coaching support module configured to be selectively activated into a mode for being coached by the establishment of a connection of the device to at least one separate coaching device in the wireless network so that the coaching support module, upon receiving notification of a System Prompt, is further operable to automatically forward system Prompts of the device to a separate connected coaching device as the system Prompts are received.

2. The device of claim 1 wherein the coaching support module is configured to serve a limited number of connections to other devices for forwarding the system Prompts.

3. The device of claim 1 wherein the coaching support module is further operable, upon receiving a system Prompt, to determine if a connection has been established to one other device before forwarding the system Prompt.

4. The device of claim 1 wherein the connection is a socket connection to the at least one other device through the wireless network.

5. The device of claim 1 wherein the establishment of a connection of the device to at least one other device is initiated by the at least one other device through the wireless network.

6. A device for a voice-enabled work environment comprising:
   a network interface operable to communicate with a wireless network;
   a voice user interface operable to,
      upon receiving a system Prompt, convert the system Prompt into speech in the form of a voice Prompt for a user; and,
      upon receiving a voice command from the user, use speech recognition technology to convert the voice command into a system command; and
   the device having a coaching mode module coupled with the voice user interface and operable to be activated into a coaching mode to coach the user of at least one other device, the coaching mode module, when the coaching mode module is activated, further operable to obtain a network address for the at least one other device and to establish a connection to the at least one other device over a wireless network for coaching the other device;
   the coaching mode module operable to receive system Prompts from the at least one other device that are sent over the wireless network connection from the at least one other device and to provide the system Prompts for the voice user interface to be output as a voice Prompt for the user of the device.

7. The device of claim 6 wherein the voice user interface selectively deactivates the speech recognition technology for a voice command when the coaching mode is activated.

8. The device of claim 6 wherein, when the coaching mode module is activated, the voice user interface only converts system Prompts that are received from the at least one other device into speech in the form of a voice Prompt.

9. The device of claim 6 wherein the coaching mode module is activated through a voice command from the user to the voice user interface.

10. The device of claim 6 further comprising a manual input component wherein the coaching mode module is activated through a manual input from the user.

11. The device of claim 6 wherein the coaching mode module is operable to obtain information for establishing the connection through interfacing with a wireless network.

12. The device of claim 6 wherein the device is further operable for terminating the connection to the at least one other device when the coaching mode module is deactivated.

13. The device of claim 6 further comprising a manual input component, the coaching mode module being deactivated through at least one of a voice command or a manual input from the user.

14. The device of claim 6 wherein the connection is a socket connection to the at least one other device through the wireless network.

15. A voice-enabled work system, comprising:
a wireless network;
at least two voice-enabled devices, a first device for a user to coach with and a second device for a user to be coached, the first and second devices configured for communicating over the wireless network, each of the at least two devices including:
a voice user interface operable to,
upon receiving a system Prompt, convert the Prompt into speech in the form of a voice Prompt for a user, and, upon receiving a voice command from the user, use speech recognition technology to convert the voice command into a system command;
the first device having a coaching mode module that is operable for being selectively activated into a coaching mode and further operable, when the coaching mode module is activated, to obtain a network address for the second device and to establish a connection with the second device over the wireless network, the first device operable to receive system Prompts from the second device to be output as voice Prompts to the user of the first device;
the second device including a coaching support module operable for detecting a connection with the first device and, upon detecting a connection, operable for being activated into a mode for being coached and automatically forwarding system Prompts to a connected first device as the system Prompts are received by the voice user interface and coaching support module of the second device.

16. The system of claim 15 wherein the second device is configured to detect connections with multiple devices and to forward system Prompts to multiple connected devices.

17. The system of claim 15 wherein the connection is a socket connection through the wireless network.

18. The system of claim 15 wherein the first device is operable to convert a received system Prompt from the second device into speech as a voice Prompt for the user.

19. The system of claim 15 wherein the first device selectively deactivates the speech recognition technology of the first device for a voice command when the coaching mode module is activated into coaching mode.

20. The system of claim 15 wherein, when the coaching mode module is activated into coaching mode, the first device only converts system Prompts that are received from the second device into speech in the form of a voice Prompt.

21. The system of claim 15 wherein the coaching mode module of the first device is activated through a voice command from the user to the voice user interface.

22. The system of claim 15 wherein the first device includes a manual input component wherein the coaching mode module is activated into coaching mode through a manual input to the first device from the user.

23. The system of claim 15 wherein the coaching mode module is operable to obtain information for establishing the connection through interfacing with a wireless network.

24. The system of claim 15 wherein the first device is further operable for terminating the connection to the second device when the coaching mode module is deactivated.

25. The system of claim 15 wherein the first device includes a manual input component further comprising a manual input component, the coaching mode module being deactivated through at least one of a voice command or a manual input to the first device from the user.

26. The system of claim 15 wherein the connection is a socket connection to the second device through the wireless network.

27. A method for training a user in voice-enabled work environment, comprising:
establishing communication over a wireless network between at least two voice-enabled devices, a first device for a user to coach with and a second device for a user to be coached, each of the at least two devices operable to, upon receiving a system Prompt, convert the system Prompt into speech, and, upon receiving a voice command from the user, use speech recognition technology to convert the voice command;
selectively activating the first device into a coaching mode and establishing a coaching connection with the second device over the wireless network;
at the second device, detecting a coaching connection with the first device;
if a coaching connection is detected, activating the second device into a mode for being coached and automatically forwarding system Prompts of the second device to a connected first device as the system Prompts are received by the second device so the system Prompts might be converted to speech at both devices;
at the first device, receiving system Prompts from the second device and converting them to speech at the first device for the user of the first device.

28. The method of claim 27 further comprising at the second device, detecting a coaching connection with multiple devices and forwarding system Prompts to multiple connected devices.

29. The method of claim 27 further comprising selectively deactivating the speech recognition technology of the first device when the coaching mode is activated.

30. The method of claim 27 further comprising, when the coaching mode is activated, converting into speech at the first device only system Prompts that are received from the second device.

31. The method of claim 27 further comprising activating the coaching mode through a voice command from the user.

32. The method of claim 27 further comprising activating the coaching mode through a manual input to the first device from the user.

33. The method of claim 27 further comprising terminating the connection to the second device when the coaching mode is deactivated.

34. The method of claim 27 further comprising deactivating the coaching mode through at least one of a voice command or a manual input to the first device from the user.

* * * * *

UNITED STATES PATENT AND TRADEMARK OFFICE
CERTIFICATE OF CORRECTION

PATENT NO. : 8,386,261 B2  
APPLICATION NO. : 12/616964  
DATED : February 26, 2013  
INVENTOR(S) : Mark B. Mellott et al.

Page 1 of 1

It is certified that error appears in the above-identified patent and that said Letters Patent is hereby corrected as shown below:

On Title Page, under Item (56) References Cited, U.S. Patent Documents, insert --6,335,860, 1/2002, Shin et al.--.

In the Drawings

In FIG. 4 (twice) reads "Occurrance" and should read --Occurrence--.

In the Specification

In Column 4, Line 31 reads ". . .using and a . . ." and should read --using a . . .--.

In Column 6, Line 56 reads "The input/outputs streams . . ." and should read --The input/output streams . . .--.

In Column 7, Line 5 reads ". . .list of user names may be also be . . ." and should read --list of user names may also be . . .--.

In Column 8, Line 48 reads ". . . so as not interrupt User A . . ." and should read --. . .so as not to interrupt User A . . .--.

In the Claims

In Column 14, Lines 4-6, CLAIM 25 reads "The system of claim 15 wherein the first device includes a manual input component further comprising a manual input component, the . . ." and should read --The system of claim 15 wherein the first device includes a manual input component, the . . .--.

Signed and Sealed this  
Third Day of June, 2014

Michelle K. Lee  
*Deputy Director of the United States Patent and Trademark Office*